United States Patent
Wang

(10) Patent No.: US 10,348,182 B2
(45) Date of Patent: Jul. 9, 2019

(54) SWITCHING CONVERTER WITH QUASI-RESONANT CONTROL AND THE METHOD THEREOF

(71) Applicant: Chengdu Monolithic Power Systems Co., Ltd., Chengdu (CN)

(72) Inventor: Siran Wang, Hangzhou (CN)

(73) Assignee: Chengdu Monolithic Power Systems Co., Ltd., Chengdu (CN)

( * ) Notice: Subject to any disclaimer, the term of this patent is extended or adjusted under 35 U.S.C. 154(b) by 0 days.

(21) Appl. No.: 16/007,978

(22) Filed: Jun. 13, 2018

(65) Prior Publication Data
US 2019/0006935 A1    Jan. 3, 2019

(30) Foreign Application Priority Data

Jun. 28, 2017   (CN) .......................... 2017 1 0504478

(51) Int. Cl.
*H02M 3/335*   (2006.01)
*H02M 1/08*   (2006.01)
*H02M 1/00*   (2006.01)

(52) U.S. Cl.
CPC ......... *H02M 1/08* (2013.01); *H02M 3/33507* (2013.01); *H02M 3/33523* (2013.01); *H02M 2001/0009* (2013.01); *H02M 2001/0025* (2013.01); *H02M 2001/0054* (2013.01); *H02M 2001/0058* (2013.01); *Y02B 70/1433* (2013.01)

(58) Field of Classification Search
CPC ...... H02M 3/156; H02M 3/157; H02M 3/335; H02M 2001/0009; H02M 2001/0025; H02M 3/33507; H02M 3/33515; H02M 3/33523

See application file for complete search history.

(56) References Cited

U.S. PATENT DOCUMENTS

| | | | |
|---|---|---|---|
| 5,680,034 A * | 10/1997 | Redl ................. | H02M 3/33507 323/235 |
| 7,116,089 B1 | 10/2006 | Nguyen et al. | |
| 2007/0096710 A1 | 5/2007 | Nguyen et al. | |
| 2011/0007526 A1 | 1/2011 | Zhang et al. | |
| 2012/0049822 A1 | 3/2012 | Li et al. | |
| 2012/0112795 A1 | 5/2012 | Wang et al. | |
| 2013/0308349 A1 | 11/2013 | Yu et al. | |

* cited by examiner

*Primary Examiner* — Gary L Laxton
(74) *Attorney, Agent, or Firm* — Perkins Coie LLP

(57) ABSTRACT

A switching converter with quasi-resonant control having a switch and an energy storage component, comprising a peak current regulating circuit configured to provide a peak current regulating signal to regulate a peak current signal or a current sense signal, wherein the peak current regulating signal is adjusted when non-CCM (Current Continuous Mode) and non-valley-switching are detected.

18 Claims, 6 Drawing Sheets

SWITCHING CONVERTER WITH QUASI-RESONANT CONTROL AND THE METHOD THEREOF

CROSS-REFERENCE TO RELATED APPLICATIONS

This application claims priority to and the benefit of Chinese Patent Application No. 201710504478.1, filed on Jun. 28, 2017, which is incorporated herein by reference in its entirety.

FIELD

The present technology relates generally to electronic circuits, and more particularly but not exclusively to switching converter with quasi-resonant control and the method thereof.

BACKGROUND

A switching converter comprises an energy storage component and a switch coupled with the energy storage component. In a typical switching converter, i.e., a flyback, the switch is electrically coupled to a primary winding of a transformer which is adopted as the energy storage component. The switch is turned on and off so as to alternately store energy in the transformer and transfer the stored energy to a secondary winding of the transformer. An output capacitor is electrically coupled to the secondary winding of the transformer and a regulated voltage is generated thereon. The regulated voltage increases and decreases inversely with the load. The heavier the load, which means the higher the output current, the lower the regulated voltage, and vice versa. Generally, the regulated voltage is fed back to control compensation for the variation of the load.

There are two primary types of control methods used with the switching converter. One is fixed frequency control and the other is variable frequency control. Although fixed frequency control is more widely adopted, it suffers from high switching loss and efficiency variation with load or input voltage. These disadvantages are overcome by variable frequency control.

An example of variable frequency control is quasi-resonant (QR) control. FIG. 1 shows example waveforms of a switching converter with QR control. The switching converter with QR control works under CRM (critical-current-mode), which means the switch is turned on to increase a current flowing through the energy storage component once the current flowing through the energy storage component reaches zero. When a current sense signal Ic indicative of a current flowing through the energy storage component decreases to zero, the energy storage component resonates with the parasitic capacitance of the switch. The switch is turned on by a switching control signal PG when the voltage VDS across the switch reaches its resonant valley (valley point of the voltage VDS during resonance) which is called valley-switching, so as to reduce switching loss. The switch is turned off by the switching control signal PG when the current sense signal Ic reaches a threshold, which in the example of FIG. 1 may be a feedback signal Vfb related to the output voltage of the switching converter. The resonance time period Tr could be omitted compared to a switching cycle and is zoomed in for clarity in FIG. 1.

However, audible noise due to the frequency hopping phenomena at certain load and input condition will be caused in the switching converter with QR control, which is related to the intrinsic output characteristic of the control scheme.

SUMMARY

It is an object of the present technology to disclose a way to eliminate the audible noise of a switching converter with QR control.

In accomplishing the above and other objects, there has been provided, in accordance with an embodiment of the present technology, a switching converter, comprising: an energy storage component; a switch coupled to the energy storage component; a peak current comparing circuit configured to generate a current control signal by comparing a current sense signal indicative of a current flowing through the energy storage component with a peak current signal; and a first logic circuit configured to generate a switching control signal to turn on and off the switch based on a frequency control signal and the current control signal; and a peak current regulating circuit configured to adjust the peak current signal or to adjust the current sense signal when two conditions are met: (1) the switching regulator is working under a non-CCM (non-current continuous-mode) and (2) a voltage across the switch is higher than a valley reference signal at the time the switch is turned on.

In accomplishing the above and other objects, there has been provided, in accordance with an embodiment of the present technology, a control circuit of a switching converter, comprising: a peak current regulating circuit configured to adjust a peak current signal or to adjust a current sense signal indicative of a current flowing through the energy storage component when two conditions are met: (1) the switching converter is working under a non-CCM (non-current-continuous-mode) and (2) a voltage across the switch is higher than a valley reference signal at the time the switch is turned on.

In accomplishing the above and other objects, there has been provided, in accordance with an embodiment of the present technology, a control method for a switching converter, wherein the switching converter comprises an energy storage component and a switch, comprising: regulating a peak current regulating signal when two conditions are met: (1) the switching converter is working under non-CCM (non-current-continuous-mode) and (2) a voltage across the switch is higher than a valley reference signal at the time the switch is turned on.

In the embodiments of the present technology, a peak of the current flowing through the energy storage component is adjusted step by step if non-valley-switching is detected while the switching converter works under DCM (discontinuous-current-mode, the current in the energy storage component goes to zero during part of the switching cycle) or CRM (critical-current-mode), to finally realize valley-switching, i.e., QR control is realized by adjusting the relationship of the peak current limit and the switching frequency of the switching converter, while the switching frequency remains relatively stable to the peak current. As a result, audible noise could be eliminated by adopting the present technology. Furthermore, the switching converter with QR control of the present technology is compatible with CCM (continuous-current-mode, the current flowing through the energy storage component never goes to zero between switching cycles) compared to the prior art.

The use of the same reference label in different drawings indicates the same or like components.

DETAILED DESCRIPTION

In the present technology, numerous specific details are provided, such as examples of circuits, components, and methods, to provide a thorough understanding of embodiments of the invention. Persons of ordinary skill in the art will recognize, however, that the invention can be practiced without one or more of the specific details. In other instances, well-known details are not shown or described to avoid obscuring aspects of the invention.

Figure 1:
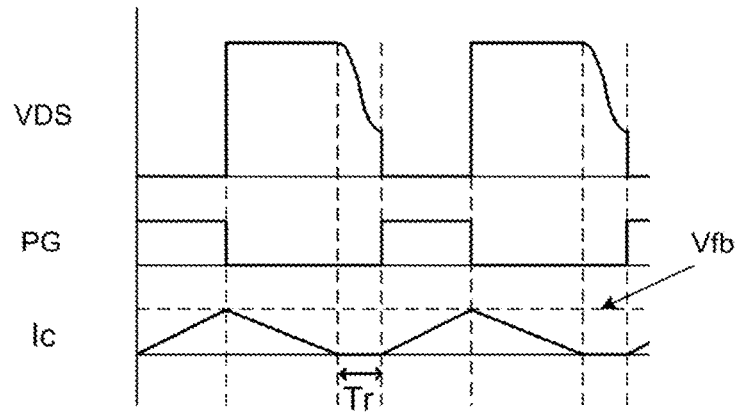
FIG. 1 shows an example waveform of a conventional switching converter with QR control.
Figure 2:
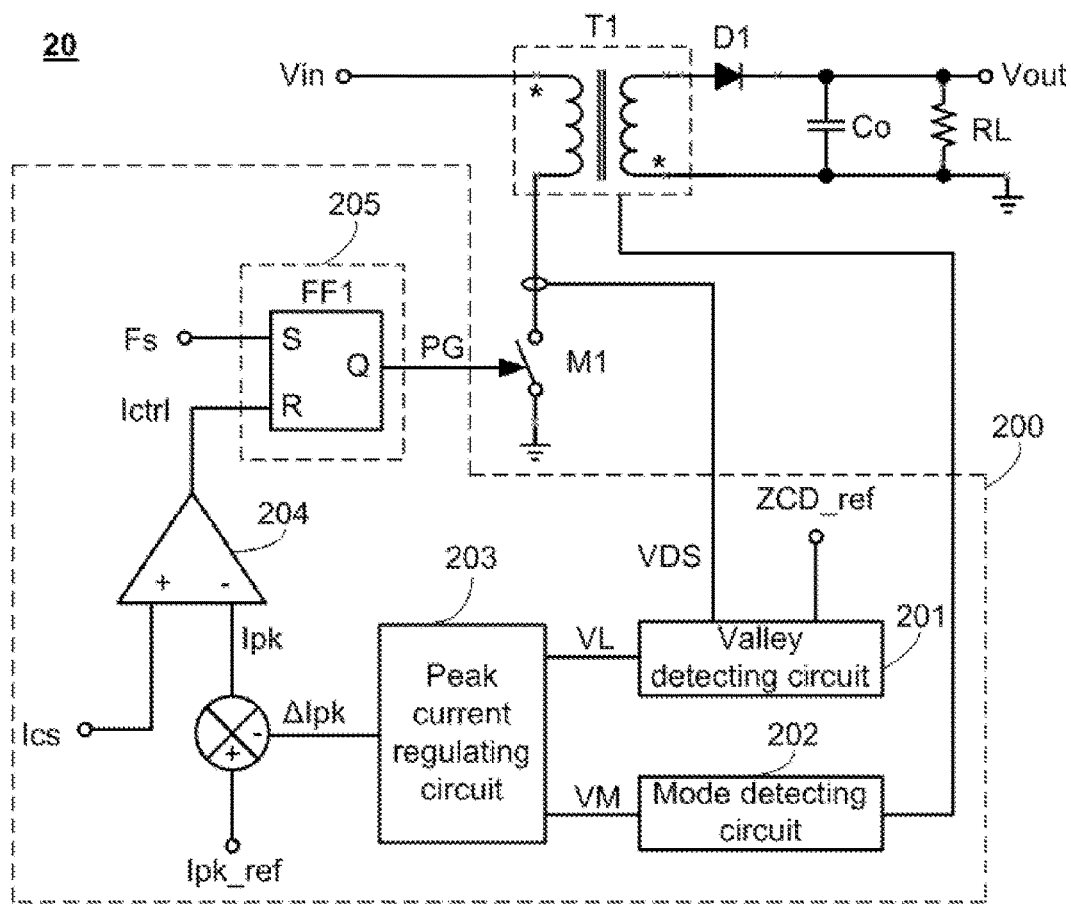
FIG. 2 schematically shows a switching converter 20 with QR control in accordance with an embodiment of the present technology.

FIG. 2 schematically shows a switching converter 20 with QR control in accordance with an embodiment of the present technology. As shown in FIG. 2, the switching converter 20 comprises: a transformer T1, a switch M1, a diode D1, an output capacitor Co, a valley detecting circuit 201, a mode detecting circuit 202, a peak current regulating circuit 203, a peak current comparing circuit 204 and a logic circuit 205. The valley detecting circuit 201, the mode detecting circuit 202, the peak current regulating circuit 203, the peak current comparing circuit 204 and the logic circuit 205 may be integrated in a control circuit 200 to control on and off of the switch M1.

The valley detecting circuit 201 detects a voltage across the switch M1, i.e., a drain-source voltage VDS, and provides a valley detecting signal VL based thereon. In one embodiment, when the drain-source voltage VDS is lower than a valley reference signal ZCD_ref at the time the switch is turned on, the valley detecting signal VL has a first voltage level, otherwise, the valley detecting signal VL has a second voltage level. The valley reference signal ZCD_ref is adopted to detect if the drain-source voltage VDS reaches its valley point during resonance and is a preset voltage signal having a value near zero, which may be 0.6 Volts or 0.7 Volts in an embodiment. Persons with ordinary skill in the art may set the value of the valley reference signal ZCD_ref according to the application spec.

The mode detecting circuit 202 detects whether the switching converter 20 is working under CCM, and provides a mode detecting signal VM based thereon. Persons of ordinary skill in the art should know that the switching converter may be working under CCM, CRM or DCM during operation. In one embodiment, when the switching converter 20 is working under CCM, the mode detecting signal VM has the first voltage level, otherwise, the mode detecting signal VM has the second voltage level.

In one embodiment, the mode detecting circuit 202 generates the mode detecting signal VM based on whether a current flowing through the energy storage component T1 crosses zero. In the example of FIG. 2, the energy storage component T1 comprises a transformer. The current flowing through the energy storage component T1 may comprise a current flowing through the secondary winding of the transformer, a current flowing through the diode D1, and a current flowing through an auxiliary winding (not illustrated) of the transformer. Any prior art circuit detecting if the switching converter 20 is working under CCM could be used with the present technology. In the present technology, DCM and CRM are collectively defined as non-CCM.

In one embodiment, the first voltage level is low voltage level, and the second voltage level is high voltage level. In other embodiment, the voltage level may be adjusted in accordance with the application. In that case, the logic circuit may be changed accordingly.

The peak current regulating circuit 203 receives the valley detecting signal VL and the mode detecting signal VM, and provides a peak current regulating signal ΔIpk based thereon. In one embodiment, the peak current regulating signal ΔIpk is adjusted by the peak current regulating circuit 203 when two conditions are met, (1) the switching converter is working under non-CCM mode and (2) the drain-source voltage VDS is higher than a valley reference signal ZCD_ref at the time the switch M1 is turned on, which is defined as non-valley-switching.

The peak current comparing circuit 204 has a first input terminal (non-inverting input terminal) configured to receive a current sense signal Ics, a second input terminal (inverting input terminal) configured to receive a peak current signal Ipk, and an output terminal configured to provide a control signal Ictrl based on the current sense signal Ics and the peak current signal Ipk. The current sense signal Ics indicates a current flowing through the transformer T1, i.e., a current flowing through the switch M1 when the switch M1 is on. In one embodiment, the peak current signal Ipk comprises a peak current reference signal Ipk_ref and the peak current regulating signal ΔIpk. In the example of FIG. 2, the peak current signal Ipk is generated by subtracting the peak current regulating signal ΔIpk from the peak current reference signal Ipk_ref. In other embodiments where the peak current signal Ipk is provided to the non-inverting terminal of the peak current comparing circuit 204, the peak current signal Ipk may be a sum of the peak current reference signal Ipk_ref and the peak current regulating signal ΔIpk. Persons of ordinary skill in the art should know that the peak current regulating signal ΔIpk may be functioned on the current sense signal Ics to serve the same purpose. Take the scheme in FIG. 2 as an example, instead of being subtracted from the peak current signal Ipk, the peak current regulating signal ΔIpk could be added to the current sense signal Ics to serve the same purpose.

The current sense signal Ics indicates the current flowing through the transformer T1. Any circuit performing current sense may be used with the present technology. In one embodiment, the current sense signal Ics may be obtained by sensing a current flowing through the primary winding or the secondary winding of the transformer T1. In other embodiment, the current sense signal Ics may be obtained by sensing a current flowing through the switch M1 or the diode D1.

The logic circuit 205 has a first input terminal configured to receive the frequency control signal Fs, a second input terminal configured to receive the current control signal Ictrl, and an output terminal configured to provide a switching control signal PG based on the frequency control signal Fs and the current control signal Ictrl, wherein the switching control signal PG controls the on and off of the switch M1. In one embodiment, the logic circuit 205 comprises a RS flip-flop FF1 having a set terminal "S" configured to receive the frequency control signal Fs, a reset terminal "R" configured to receive the current control signal Ictrl, and an output terminal "Q" configured to provide the switching control signal PG. In one embodiment, when the RS flip-flop FF1 is set by the frequency control signal Fs, the switch M1 is turned on by the switching control signal PG, and the current flowing through the primary winding of the transformer T1 increases; when the current flowing through the primary winding of the transformer T1 increases to a limit, i.e., the current sense signal Ics increases to the peak current signal Ipk, the peak comparing circuit 204 provides the current control signal Ictrl to reset the RS flip-flop FF1, and then the switch M1 is turned off by the switching control signal PG, and then energy is transferred from the primary winding to the secondary winding of the transformer T1.

Figure 3:
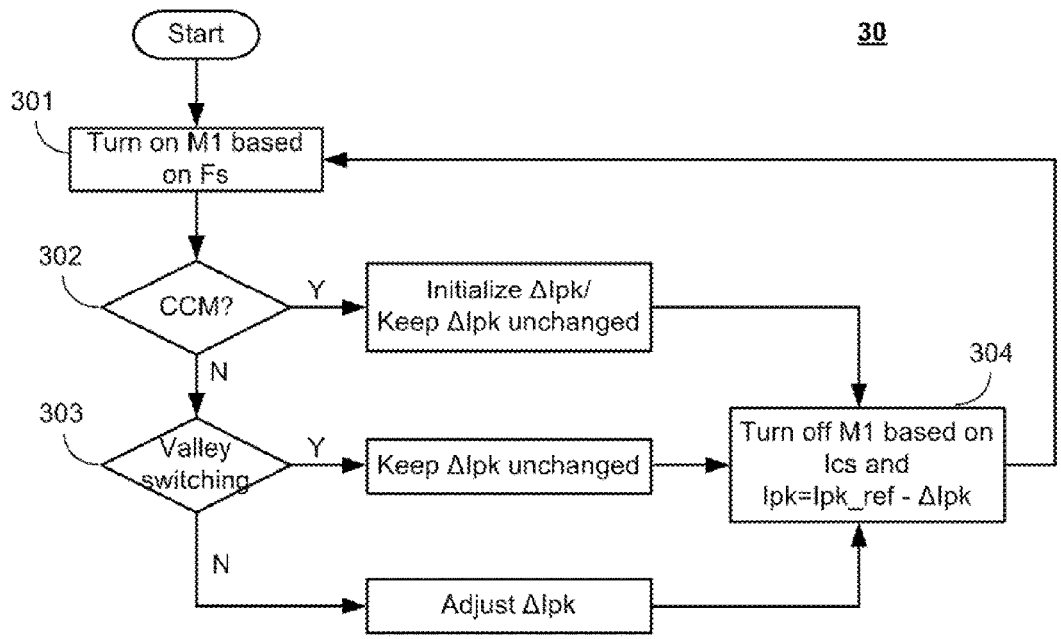
FIG. 3 shows a control method 30 used with switching converters in accordance with an embodiment of the present technology.

FIG. 3 shows a control method 30 used with switching converters in accordance with an embodiment of the present technology. The control method 30 comprises regulating a peak current regulating signal ΔIpk when the switching converter is working under non-CCM (non-current-continuous-mode) and the voltage VDS across the switch is higher than the valley reference signal ZCD_ref at the time the switch M1 is turned on (non-valley switching). FIG. 3 shows a flow chart of the operation of the switching converter 20 in FIG. 2. The steps of the control method 30 show the operation of the switching converter 20 in a single switching cycle. As shown in FIG. 3, the control method 30 comprises: step 301, turning on the switch M1 based on the frequency control signal Fs; step 302, detecting the current flowing through the transformer T2 to determine if the switching converter is working under CCM, if yes, the peak current regulating signal ΔIpk is initialized or kept unchanged, otherwise, go to step 303; step 303, detecting if the drain-source voltage VDS is higher than the valley reference signal ZCD_ref at the time the switch M1 is turned on, if yes, the peak current regulating signal ΔIpk is kept unchanged, and go to step 304, otherwise, the peak current regulating signal ΔIpk is adjusted, and then go to step 304; step 304, turning off the switch M1 based on a comparing result of the current sense signal Ics and the peak current signal Ipk, wherein the current sense signal Ics indicates the current flowing through the energy storage component, and the peak current signal Ipk comprises the peak current reference signal Ipk_ref and the peak current regulating signal ΔIpk.

In one embodiment, the peak current regulating signal ΔIpk has a preset maximum value and a preset minimum value.

In one embodiment, adjusting the peak current regulating signal ΔIpk comprises varying the peak current regulating signal ΔIpk in the form of triangle waveform with the preset maximum value and the preset minimum value.

In one embodiment, adjusting the peak current regulating signal ΔIpk comprises varying the peak current regulating signal ΔIpk in the form of sawtooth waveform with the preset maximum value and the preset minimum value.

Figure 4:
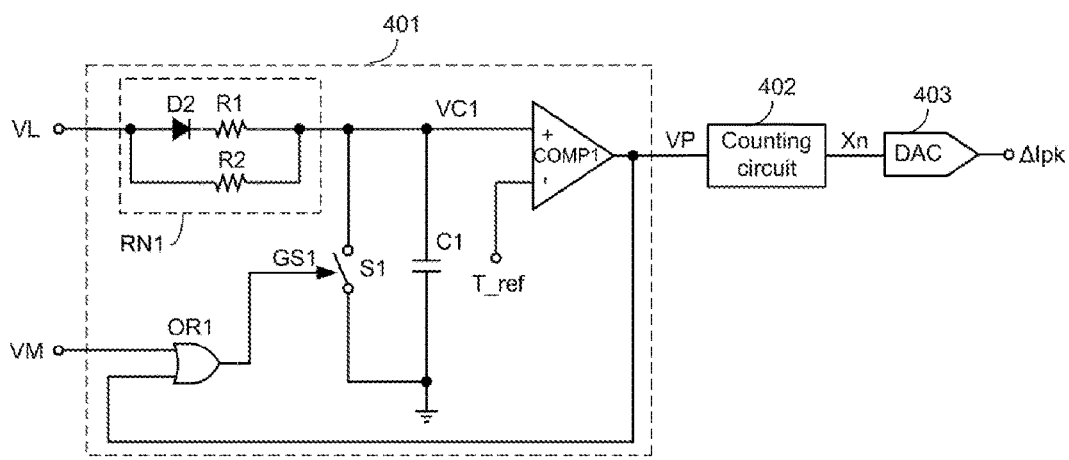
FIG. 4 schematically shows a peak current regulating circuit 40 in accordance with an embodiment of the present technology.

FIG. 4 schematically shows a peak current regulating circuit 40 in accordance with an embodiment of the present technology. As shown in FIG. 4, the peak current regulating circuit 40 comprises: a pulse circuit 401, having a first input terminal configured to receive the valley detecting signal VL, a second input terminal configured to receive the mode detecting signal VM, and an output terminal configured to provide a pulse signal VP based on the valley detecting signal VL and the mode detecting signal VM; a counting circuit 402 having an input terminal coupled to the output terminal of the pulse circuit 401 to receive the pulse signal VP, and an output terminal configured to provide a counting signal Xn based on the pulse signal VP; and a DAC (digital-to-analog-converting) circuit 403 having an input terminal coupled to the counting circuit 402 to receive the counting signal Xn, and an output terminal configured to provide the peak current regulating signal ΔIpk based on the counting signal Xn.

As shown in FIG. 4, the pulse circuit 401 comprises a resistor networks RN1, an OR gate OR1, a discharge switch S1, a capacitor C1 and a comparator COMP1. The resistor networks RN1 comprises a resistor R2 coupled in parallel with a series of a resistor R1 and a diode D2.

Figure 5:
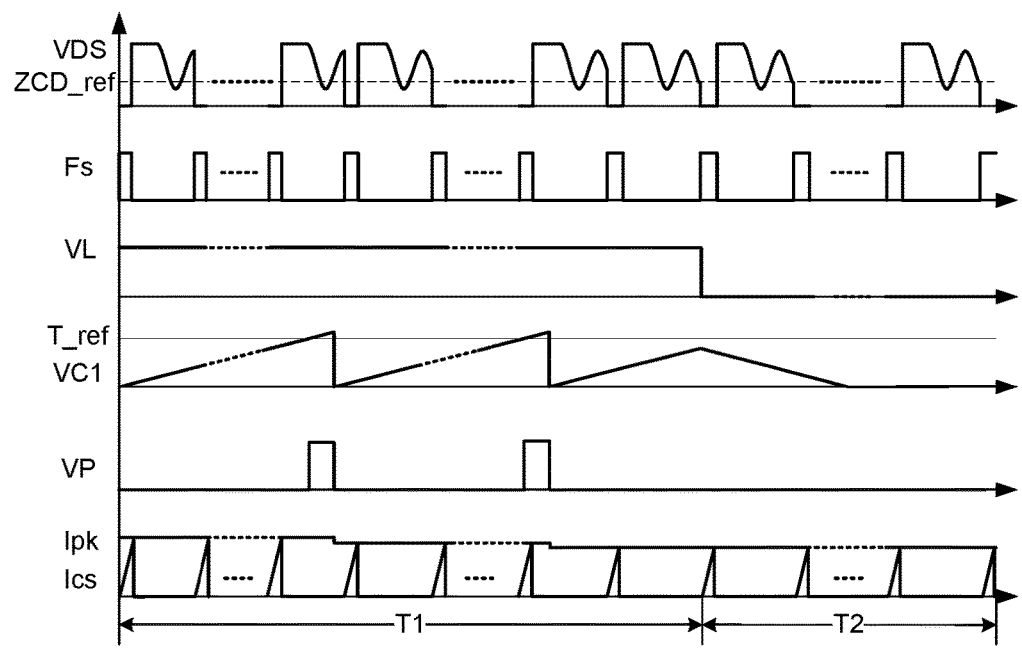
FIG. 5 shows waveforms of signals from the peak current regulating circuit 40 in FIG. 4.

FIG. 5 shows waveforms of signals from the peak current regulating circuit 40 in FIG. 4. The operation of the peak current regulating circuit 40 is illustrated with reference to FIGS. 4 and 5. As shown in FIG. 5, during time period T1, the mode detecting signal VL (not shown in FIG. 5) indicates that the switching converter 20 is working under non-CCM mode, and the valley detecting signal VL indicates that the voltage VDS across the switch M1 is higher than the valley reference signal ZCD_ref at the time the switch M1 is turned on (non-valley-switching), i.e., the valley detecting signal VL has a high voltage level. The discharge switch S1 is then turned off and the valley detecting signal VL charges the capacitor C1 through the resistor networks RN1, and the voltage signal VC1 across the capacitor C1 increases. When the voltage signal VC1 increases to a reference signal T_ref, the comparator COMP1 flips, and generates a pulse to turn on the discharge switch S1 via the OR gate OR1. Then the capacitor C1 is discharged and the voltage signal VC1 decreases. As a result, the comparator COMP1 flips again when the voltage signal VC1 decreases to the reference signal T_ref, and the pulse of the pulse signal VP ends. If the mode detecting signal VM still indicates that the switching converter 20 is working under non-CCM mode and the valley detecting signal VL still indicates the non-valley-switching in the next switching cycle, the operation repeats. During time period T2, the valley detecting signal VL indicates that the drain-source voltage VDS is lower than the valley reference signal ZCD_ref at the time the switch M1 is turned on (valley-switching), i.e., the valley detecting signal VL has low voltage level. Then the capacitor C1 will not be charged and no pulse is generated by the comparator COMP1. If the mode detecting signal VM has high voltage level, the charges remained in the capacitor C1 will be released through the switch S1. Otherwise, the charges remained in the capacitor C1 will be released through the resistor R2.

The counting circuit 402 receives the pulse signal VP, and counts the pulses. The counting circuit 402 may comprise sequence counter, reverse counter and loop counter. Persons of ordinary skill in the art could choose proper counter according to the application. The DAC circuit 403 converts the counting signal Xn to an analog signal, i.e., the peak current regulating signal ΔIpk. In the example of FIG. 4, the counting circuit 402 comprises sequence counter. The counting circuit 402 counts every pulse, and the counting signal Xn and the peak current regulating signal ΔIpk increases based thereon. Accordingly, the peak current signal Ipk decreases. The counting signal Xn is a digital signal with any suitable digits.

In some embodiments, the resistor networks RN1 may have different structures. For example, the resistor networks RN1 may comprise a single resistor. In some embodiments, the resistor networks RN1 may be replaced by a controlled current source. The controlled current source is controlled by the valley detecting signal VL. When the valley detecting signal VL indicates the non-valley-switching, the controlled current source charges the capacitor C1, otherwise, the controlled current source is disabled.

Figure 6:
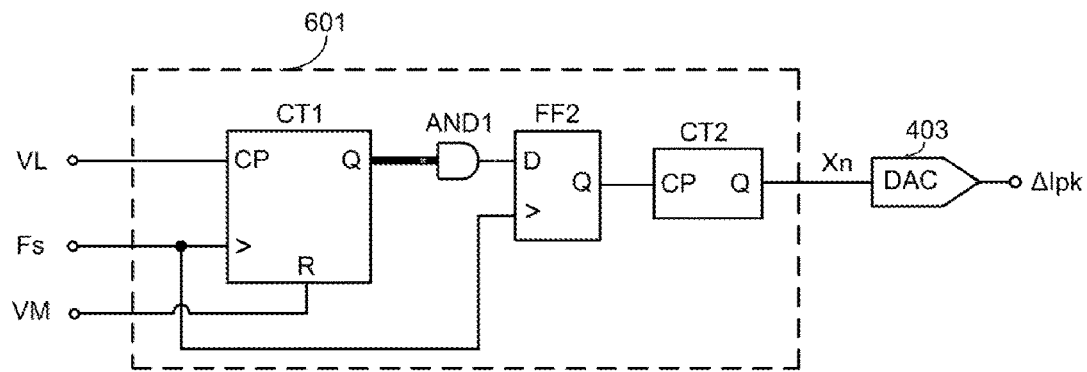
FIG. 6 schematically shows a peak current regulating circuit 60 in accordance with an embodiment of the present technology.

FIG. 6 schematically shows a peak current regulating circuit 60 in accordance with an embodiment of the present technology. As shown in FIG. 6, the peak current regulating circuit 60 comprises: a counting circuit 601 having an input terminal configured to receive the valley detecting signal VL, a clock terminal configured to receive the frequency control signal Fs, a reset terminal configured to receive the mode detecting signal VM, and an output terminal configured to provide the counting signal Xn based on the valley detecting signal VL, the frequency control signal Fs, and the mode detecting signal VM; and the DAC circuit 403 having an input terminal coupled to the output terminal of the counting circuit 601 to receive the counting signal Xn, and an output terminal configured to provide the peak current regulating signal ΔIpk based on the counting signal Xn.

In the example of FIG. 6, the counting circuit 601 comprises a D flip-flop FF2, counters CT1 and CT2, and an AND gate AND1. When non-CCM and non-valley-switching are detected, i.e., the valley detecting signal VL has high voltage level and the mode detecting signal VM has low voltage level, the counter CT1 counts every clock, i.e., the switching cycles of the switching converter. When the counter CT1 counts to a maximum value, which means every digit of the output signal of the counter CT1 is logic high in one embodiment, the AND gate AND1 provides a logic high signal to the input terminal of the D flip-flop FF2. Then the logic high signal is provided to the input terminal of the counter CT2 at the clock of the D flip-flop FF2, i.e., at the time the switch M1 is turned on. The counter CT2 counts when receiving the logic high signal and generates the counting signal Xn based thereon. As a result, the counting signal Xn and the peak current regulating signal ΔIpk varies, i.e., are regulated, when non-CCM and non-valley-switching are detected. When the switching converter works under CCM, the mode selecting signal VM resets the counter CT2, and the peak current regulating signal ΔIpk maintains unchanged in the example of FIG. 6.

In one embodiment, reverse counter CT1 is adopted. The counter CT1 counts down every switching cycle when non-CCM and non-valley-switching are detected. When the output signal of the counter CT1 decreases to a minimum value, the counter CT1 restarts from a maximum value, and the operation repeats.

In one embodiment, the mode detecting signal VM resets the counters CT1 and CT2 when the switching converter enters CCM, and initializes the counting signal Xn. Accordingly, the peak current regulating signal ΔIpk is initialized too.

In some embodiments, the counting circuit 601 comprises a single counter. The single counter counts every switching cycle when non-CCM and non-valley-switching are detected. The mode detecting signal VM could be adopted as the reset signal of the single counter. In some embodiments, the single counter counts once per N switching cycles when non-CCM and non-valley-switching are detected. N could be chosen according to the application spec.

Figure 7:
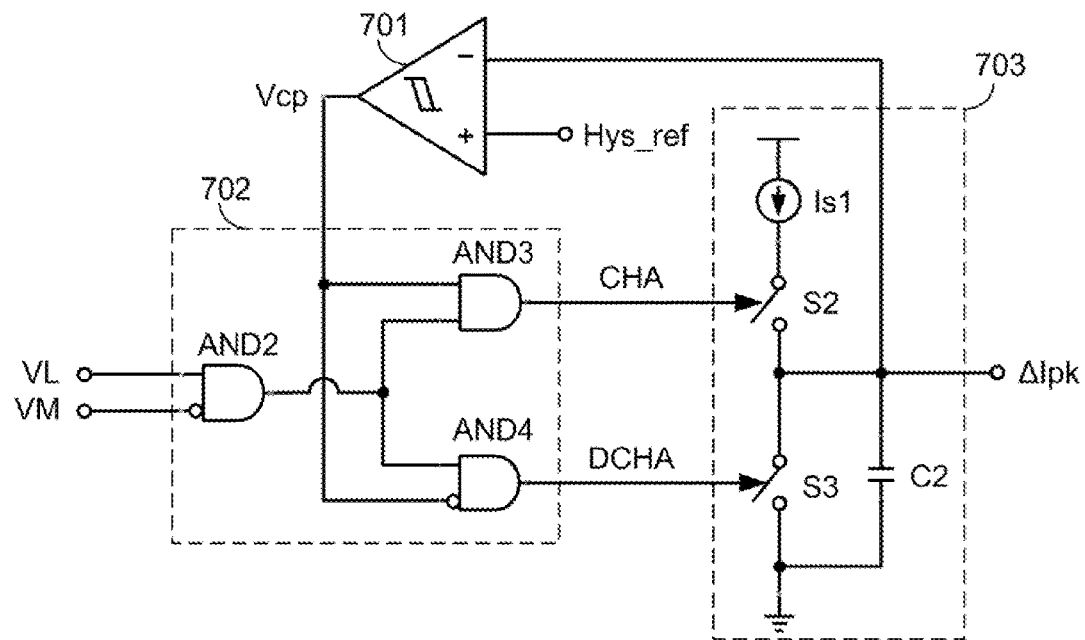
FIG. 7 schematically shows a peak current regulating circuit 70 in accordance with an embodiment of the present technology.

FIG. 7 schematically shows a peak current regulating circuit 70 in accordance with an embodiment of the present technology. As shown in FIG. 7, the peak current regulating circuit 70 comprises: a comparator 701 having a first input terminal configured to receive the peak current regulating signal ΔIpk, a second input terminal configured to receive a threshold signal Hys_ref, and an output terminal configured to provide a comparing signal Vcp based on the peak current regulating signal ΔIpk and the threshold signal Hys_ref; a logic circuit 702 having a first input terminal coupled to the output terminal of the comparator 701 to receive the comparing signal Vcp, a second input terminal configured to receive the valley detecting signal VL, a third input terminal configured to receive the mode detecting signal VM, a first output terminal and a second output terminal configured to respectively provide a charge control signal CHA and a discharge control signal DCHA based on the comparing signal Vcp, the valley detecting signal VL and the mode detecting signal VM; and a charge/discharge circuit 703 having a first input terminal coupled to the first output terminal of the logic circuit 702 to receive the charge control signal CHA, a second input terminal coupled to the second output terminal of the logic circuit 702 to receive the discharge control signal DCHA, and an output terminal configured to provide the peak current regulating signal ΔIpk based on the charge control signal CHA and the discharge control signal DCHA.

In the example of FIG. 7, the logic circuit 702 comprises AND gates AND2, AND3 and AND4. The comparator 701 is a hysteresis comparator, and the threshold signal Hys_ref has an upper limit and a lower limit. The charge/discharge circuit 703 comprises a current source Ist switches S2 and S3, and a capacitor C2. The AND gate AND2 reverses the mode detecting signal VM and performs AND operation to the reversed signal and the valley detecting signal VL. When non-CCM and non-valley-switching are detected, i.e., the valley detecting signal VL has high voltage level and the mode detecting signal VM has low voltage level, the AND gate AND2 provides a logic high signal. Then the AND gates AND3 and AND4 respectively provides the charge control signal CHA and the discharge control signal DCHA with opposite phases to turn on and off the switches S2 and S3 alternately. When the switch S2 is on and the switch S3 is off, the current source Is1 charges the capacitor C2. As a result, the peak current regulating signal ΔIpk increases. When the peak current regulating signal ΔIpk increases to the upper limit of the threshold signal Hys_ref, the comparator 701 flips, and the charge control signal CHA turned off the switch S2. Meanwhile, the discharge control signal DCHA turned on the switch S3, and the capacitor C2 is discharged. As a result, the peak current regulating signal ΔIpk decreases. When the peak current regulating signal ΔIpk decreases to the lower limit of the threshold signal Hys_ref, the comparator 701 flips again. Then the switch S2 is turned on and the switch S3 is turned off, the capacitor C2 is charged again. As a result, the peak current regulating signal ΔIpk increases, and the operation repeats. When either CCM is detected or valley-switching is detected, i.e., either the mode detecting signal VM has high voltage level or the mode detecting signal VL has low voltage level, the AND gate AND2 provides a logic low signal to turn off both the switches S2 and S3 via the AND gates AND3 and AND4. As a result, the peak current regulating signal ΔIpk keeps unchanged.

Figure 8:
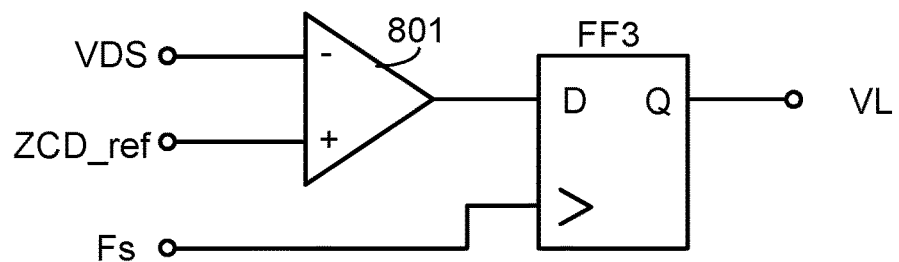
FIG. 8 schematically shows a valley detecting circuit 80 in accordance with an embodiment of the present technology.

FIG. 8 schematically shows a valley detecting circuit 80 in accordance with an embodiment of the present technology. As shown in FIG. 8, the valley detecting circuit 80 comprises a comparator 801 and a D flip-flop FF3. The frequency control signal Fs is provided to a clock terminal of the D flip-flop FF3. When the frequency control signal Fs turns on the switch M1, the comparator 801 provides an output signal to the D flip-flop FF3. When the drain-source voltage VDS is lower than or equal to the valley reference signal ZCD_ref, the comparator 801 provides a logic high signal to the input terminal of the D flip-flop FF3. The output signal of the D flip-flop FF3, i.e., the valley detecting signal VL, is set high at the time the frequency control signal Fs turns on the switch M1.

The valley detecting circuit may be implemented in several ways. Any circuit detecting the drain-source voltage VDS at the time the switch M1 is turned on could be used as valley detecting circuit.

The frequency control signal Fs may be realized by many circuits, e.g., a VCO (Voltage Controlled Oscillator). The input signal of the VCO could be an amplified error signal between a reference signal and a feedback signal of the output voltage of the switching converter.

Figure 9:
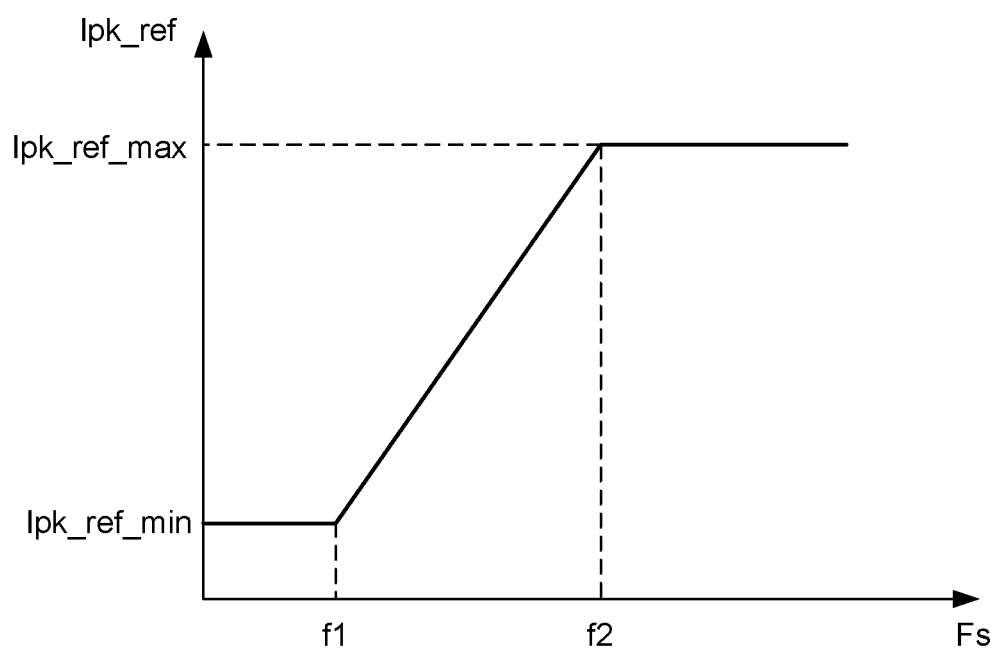
FIG. 9 shows the relationship of the peak current reference signal Ipk_ref and the frequency control signal Fs in accordance with an embodiment of the present technology.
Figure 10:
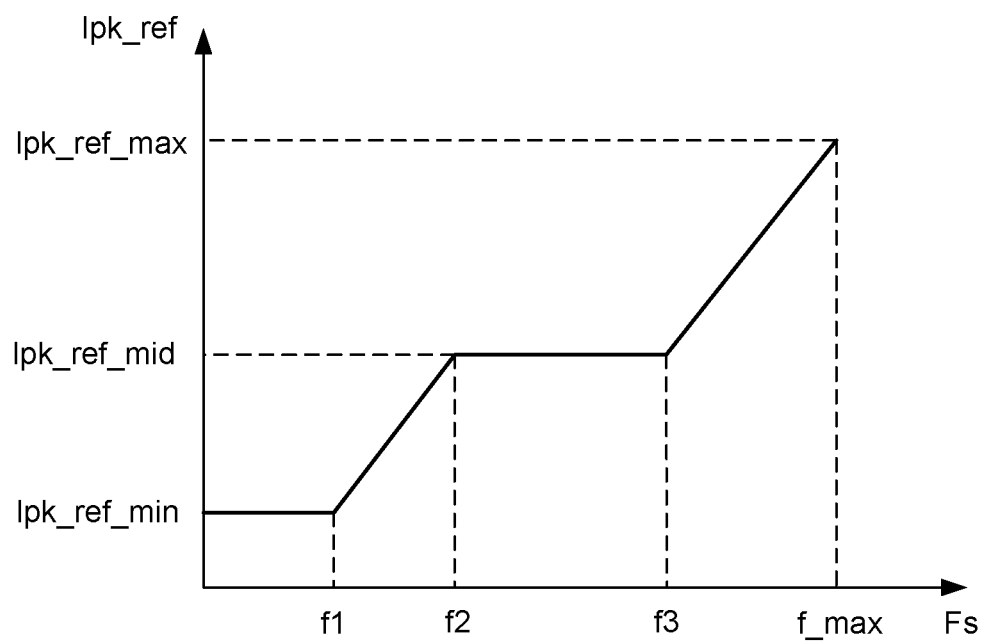
FIG. 10 shows the relationship of the peak current reference signal Ipk_ref and the frequency control signal Fs in accordance with an embodiment of the present technology.

The peak current reference signal Ipk_ref may have constant value, or may be a function of the frequency control signal Fs, i.e., Ipk_ref=f(Fs). FIGS. 9 and 10 show the relationship of the peak current reference signal Ipk_ref and the frequency control signal Fs in accordance with embodiments of the present technology.

In FIG. 9, when a frequency of the frequency control signal Fs is lower than a preset first frequency threshold f1, the peak current reference signal Ipk_ref has a minimum value Ipk_ref_min; when the frequency of the frequency control signal Fs is between the preset first frequency threshold f1 and a preset second frequency threshold f2, the peak current reference signal Ipk_ref increases as the frequency of the frequency control signal Fs increases; when the frequency of the frequency control signal Fs is higher than the preset second frequency threshold f2, the peak current reference signal Ipk_ref keeps a maximum value Ipk_ref_max unchanged.

In FIG. 10, when the frequency of the frequency control signal Fs is lower than the preset first frequency threshold f1, the peak current reference signal has the minimum value Ipk_ref_min; when the frequency of the frequency control signal Fs is between the preset first frequency threshold f1 and the preset second frequency threshold f2, the peak current reference signal increases as the frequency of the frequency control signal Fs increases; when the frequency of the frequency control signal Fs is between the preset second frequency threshold f2 and a preset third frequency threshold f3, the peak current reference signal Ipk_ref has a middle value Ipk_ref_mid; when the frequency of the frequency control signal Fs is higher than the preset third frequency threshold f3, the peak current reference signal Ipk_ref increases as the frequency of the frequency control signal Fs increases; when the frequency of the frequency control signal reaches a maximum frequency threshold f_max, the peak current reference signal Ipk_ref reaches a maximum value Ipk_ref_max.

Persons of ordinary skill in the art could produce circuits with switches, capacitors and current source to generate the peak current reference signal Ipk_ref according to the waveforms shown in FIGS. 9 and 10. Meanwhile, The relationship of the peak current reference signal Ipk_ref and the frequency control signal Fs may varies in different applications.

Flyback converter is used as an example to illustrate the substance of the present technology. Persons of ordinary skill in the art should know that the present technology could be adopted by other kinds of converters, e.g., BUCK, BOOST, or BUCK-BOOST.

Obviously many modifications and variations of the present technology are possible in light of the above teachings. It is therefore to be understood that within the scope of the appended claims the invention may be practiced otherwise than as specifically described. It should be understood, of course, the foregoing disclosure relates only to a preferred embodiment (or embodiments) of the invention and that numerous modifications may be made therein without departing from the spirit and the scope of the invention as set forth in the appended claims. Various modifications are contemplated and they obviously will be resorted to by those skilled in the art without departing from the spirit and the scope of the invention as hereinafter defined by the appended claims as only a preferred embodiment(s) thereof has been disclosed.

What is claimed is:

1. A switching converter, comprising:
   an energy storage component;
   a switch coupled to the energy storage component;
   a peak current comparing circuit configured to generate a current control signal by comparing a current sense signal indicative of a current flowing through the energy storage component with a peak current signal; and
   a first logic circuit configured to generate a switching control signal to turn on and off the switch based on a frequency control signal and the current control signal; and
   a peak current regulating circuit configured to adjust the peak current signal or to adjust the current sense signal when two conditions are met: (1) the switching regulator is working under a non-CCM (non-current continuous-mode) and (2) a voltage across the switch is higher than a valley reference signal at the time the switch is turned on.

2. The switching converter of claim 1, wherein the peak current regulating circuit comprises:
   a pulse circuit configured to generate a pulse for a switching cycle when two conditions are met, (1) the switching regulator is working under the non-CCM (non-current continuous mode) and (2) the voltage across the switch is higher than the valley reference signal at the time the switch is turned on;
   a counting circuit configured to generate a counting signal by counting pulses from the pulse circuit; and
   a DAC (digital-to-analog-converting) circuit configured to convert the counting signal to a peak current regulating signal.

3. The switching converter of claim 1, wherein the peak current regulating circuit comprises:
   a counting circuit configured to generate a counting signal, wherein the counting signal varies during a switching cycle when two conditions are met, (1) the switching regulator is working under a non-CCM (non-current-continuous-mode) and (2) a voltage across the switch is higher than a valley reference signal at the time the switch is turned on, and wherein the counting signal is reset by a mode detecting signal when the switching converter enters CCM (current-continuous-mode); and
   a DAC circuit configured to convert the counting signal to a peak current regulating signal;

wherein the mode detecting signal indicates whether the switching converter is working under CCM or non-CCM.

4. The switching converter of claim 1, wherein the peak current regulating circuit comprises:
   a comparator configured to generate a comparing signal by comparing a peak current regulating signal with a threshold signal;
   a second logic circuit configured to generate a charge control signal and a discharge control signal based on the comparing signal from the comparator, a valley detecting signal and a mode detecting signal; and
   a capacitor configured to generate the peak current regulating signal by being charged by a current source in response to the charge control signal and being discharged in response to the discharge control signal;
   wherein the mode detecting signal indicates whether the switching converter is working under CCM or non-CCM, and the valley detecting signal indicates whether a voltage across the switch is lower than a valley reference signal at the time the switch is turned on.

5. The switching converter of claim 1, further comprising a valley detecting circuit, wherein the valley detecting circuit comprises:
   a comparator configured to generate a comparing signal by comparing the voltage across the switch with a valley reference signal; and
   a D flip-flop configured to provide the comparing signal as a valley detecting signal at the time the switch is turned on by the frequency control signal.

6. A control circuit of a switching converter having a switch and an energy storage component, comprising:
   a peak current regulating circuit configured to adjust a peak current signal or to adjust a current sense signal indicative of a current flowing through the energy storage component when two conditions are met: (1) the switching converter is working under a non-CCM (non-current-continuous-mode) and (2) a voltage across the switch is higher than a valley reference signal at the time the switch is turned on; and
   a valley detecting circuit having: a comparator configured to generate a comparing signal by comparing the voltage across the switch to the valley reference signal; and a D flip-flop configured to provide the comparing signal as a valley detecting signal at the time the switch is turned on by a frequency control signal.

7. The control circuit of claim 6, wherein the peak current regulating circuit comprises:
   a pulse circuit configured to generate a pulse signal having a pulse for a switching cycle when two conditions are met: (1) the switching regulator is working under the non-CCM (non-current continuous mode) and (2) the voltage across the switch is higher than the valley reference signal at the time the switch is turned on;
   a counting circuit configured to generate a counting signal by counting pulses of the pulse signal; and
   a DAC (digital-to-analog-converting) circuit configured to convert the counting signal to a peak current regulating signal;
      wherein: in one case, the peak current signal is adjusted by adding with or subtracting by the peak current regulating signal; and in another case, the current sense signal is adjusted by adding with or subtracting by the peak current regulating signal.

8. The control circuit of claim 7, wherein the pulse circuit comprises:
   a resistor networks configured to charge a capacitor in response to a valley detecting signal when the valley detecting signal indicates that the voltage across the switch is higher than the valley reference signal at the time the switch is turned on;
   a logic circuit configured to provide a logic signal to control a discharge switch in response to the pulse signal and a mode detecting signal indicative of whether the switching converter is working under CCM (current-continuous-mode);
   the discharge switch coupled in parallel with the capacitor to discharge the capacitor in response to the logic signal;
   the capacitor coupled between the resistor networks and a ground reference, wherein the capacitor is to be charged by the resistor networks when the valley detecting signal indicates that the voltage across the switch is higher than the valley reference signal at the time the switch is turned on, and wherein the capacitor is to be discharged when the discharge switch is turned on by the logic signal; and
   a comparator configured to generate the pulse signal by comparing a voltage across the capacitor with a reference signal.

9. The control circuit of claim 6, wherein the peak current regulating circuit comprises:
   a counting circuit configured to generate a counting signal, wherein the counting signal varies during a switching cycle when two conditions are met: (1) the switching regulator is working under a non-CCM (non-current continuous mode) and (2) the voltage across the switch is higher than the valley reference signal at the time the switch is turned on, and wherein the counting signal is reset when the switch is turned on in response to the frequency control signal; and
   a DAC circuit configured to convert the counting signal to a peak current regulating signal;
      wherein: in one case, the peak current signal is adjusted by adding with or subtracting by the peak current regulating signal; and in another case, the current sense signal is adjusted by adding with or subtracting by the peak current regulating signal.

10. The control circuit of claim 6, wherein the peak current regulating circuit comprises:
   a comparator configured to generate a comparing signal by comparing a peak current regulating signal with a threshold signal;
   a logic circuit configured to generate a charge control signal and a discharge control signal in response to the comparing signal, a valley detecting signal, and a mode detecting signal; and
   a capacitor configured to generate the peak current regulating signal by being charged by a current source in response to the charge control signal and being discharged in response to the discharge control signal;
      wherein the mode detecting signal indicates whether the switching converter is working under CCM or non-CCM, and the valley detecting signal indicates whether the voltage across the switch is higher than the valley reference signal at the time the switch is turned on; and
      wherein: in one case, the peak current signal is adjusted by adding with or subtracting by the peak current regulating signal; and in another case, the current sense signal is adjusted by adding with or subtracting by the peak current signal.

11. The control circuit of claim 6, further comprising:
a peak current comparing circuit configured to generate a current control signal by comparing a current sense signal indicative of a current flowing through the energy storage component with the peak current signal; and
a logic circuit configured to generate a switching control signal to turn on the switch in response to a frequency control signal, and to turn off the switch in response to the current control signal.

12. The control circuit of claim 11, wherein the peak current signal comprises a peak current reference signal, and wherein the peak current reference signal and the frequency control signal has a relationship of:
the peak current reference signal has a minimum value when a frequency of the frequency control signal is lower than a first frequency threshold;
the peak current reference signal increases as the frequency of the frequency control signal increases when the frequency of the frequency control signal is between the first frequency threshold and a second frequency threshold; and
the peak current reference signal keeps a maximum value unchanged when the frequency of the frequency control signal is higher than the second frequency threshold.

13. The control circuit of claim 11, wherein the peak current signal comprises a peak current reference signal, and wherein the peak current reference signal and the frequency control signal has a relationship of:
the peak current reference signal has a minimum value when a frequency of the frequency control signal is lower than a first frequency threshold;
the peak current reference signal increases as the frequency of the frequency control signal increases when the frequency of the frequency control signal is between the first frequency threshold and a second frequency threshold;
the peak current reference signal has a middle value when the frequency of the frequency control signal is between the second frequency threshold and a third frequency threshold;
the peak current reference signal increases as the frequency of the frequency control signal increases when the frequency of the frequency control signal is higher than the third frequency threshold; and
the peak current reference signal reaches a maximum value when the frequency of the frequency control signal reaches a maximum frequency threshold.

14. A control method of a switching converter, wherein the switching converter comprises an energy storage component and a switch, comprising:
turning on the switch in response to a frequency control signal;
detecting if the switching converter is working under CCM (current-continuous mode);
initializing a peak current regulating signal or keeping the peak current regulating signal unchanged when the switching converter is working under CCM;
detecting if the voltage across the switch is higher than the valley reference signal at the time the switch is turned on when the switching converter is working under non-CCM, if yes, regulating the peak current regulating signal, otherwise, keeping the peak current regulating signal unchanged;
regulating the peak current regulating signal when two conditions are met: (1) the switching converter is working under non-CCM (non-current-continuous-mode) and (2) a voltage across the switch is higher than a valley reference signal at the time the switch is turned on; and
turning off the switch in response to a comparing result of a peak current signal and a current sense signal indicating a current flowing through the energy storage component;
wherein: in one case, the peak current signal is adjusted by adding with or subtracting by the peak current regulating signal; and in another case, the current sense signal is adjusted by adding with or subtracting by the peak current regulating signal.

15. The control method of claim 14, wherein the peak current reference signal and the frequency control signal has a relationship of:
the peak current reference signal has a minimum value when a frequency of the frequency control signal is lower than a first frequency threshold;
the peak current reference signal increases as the frequency of the frequency control signal increases when the frequency of the frequency control signal is between the first frequency threshold and a second frequency threshold; and
the peak current reference signal keeps a maximum value unchanged when the frequency of the frequency control signal is higher than the second frequency threshold.

16. The switching converter of claim 14, wherein the peak current reference signal and the frequency control signal has a relationship of:
the peak current reference signal has a minimum value when a frequency of the frequency control signal is lower than a first frequency threshold;
the peak current reference signal increases as the frequency of the frequency control signal increases when the frequency of the frequency control signal is between the first frequency threshold and a second frequency threshold;
the peak current reference signal has a middle value when the frequency of the frequency control signal is between the second frequency threshold and a third frequency threshold;
the peak current reference signal increases as the frequency of the frequency control signal increases when the frequency of the frequency control signal is higher than the third frequency threshold; and
the peak current reference signal reaches a maximum value when the frequency of the frequency control signal reaches a maximum frequency threshold.

17. The control method of claim 14, wherein regulating the peak current regulating signal comprises varying the peak current regulating signal in the form of triangle waveform with a maximum value and a minimum value.

18. The control method of claim 14, wherein regulating the peak current regulating signal comprises varying the peak current regulating signal in the form of sawtooth waveform with a maximum value and a minimum value.

* * * * *